Figure 1:
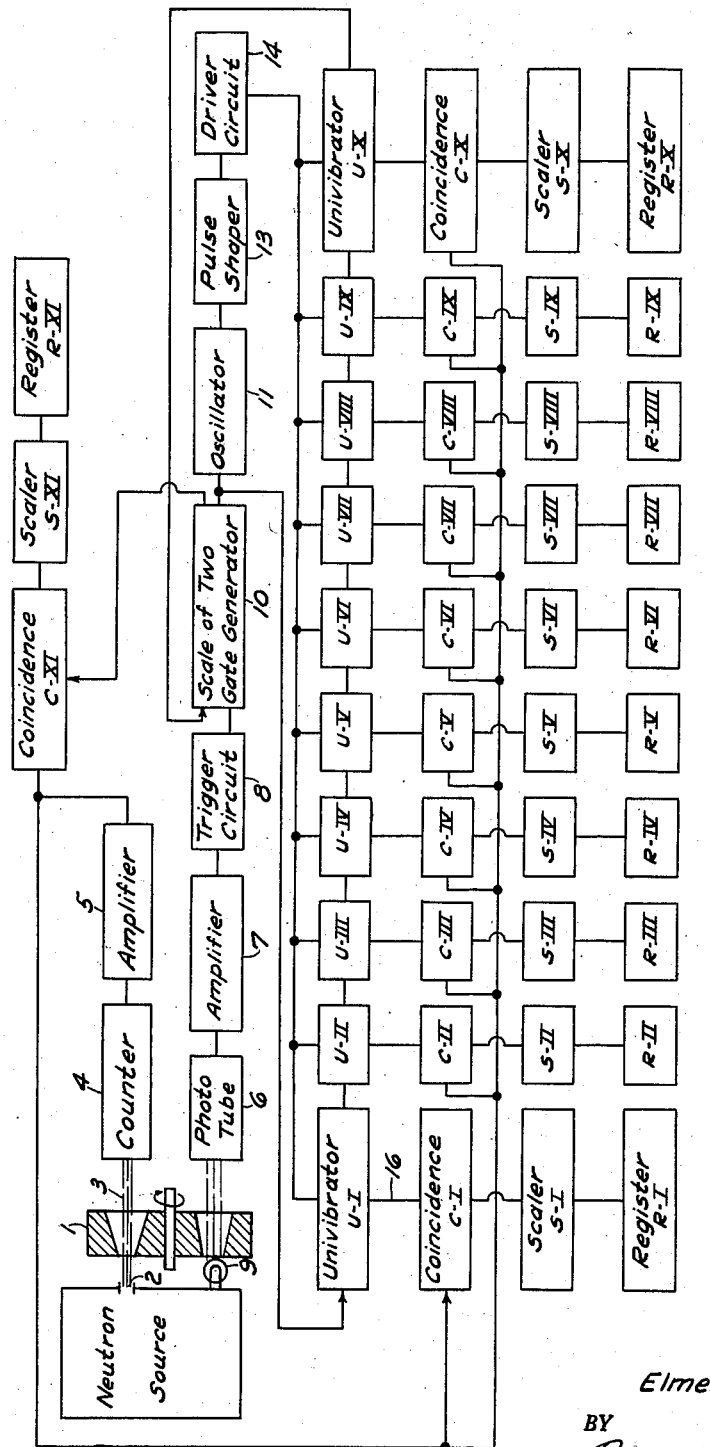

July 29, 1958

E. J. WADE 2,845,530

PULSE SORTER

Filed Sept. 28, 1953

2 Sheets-Sheet 1

INVENTOR.
Elmer J. Wade
BY

ATTORNEY

July 29, 1958

E. J. WADE 2,845,530

PULSE SORTER

Filed Sept. 28, 1953

2 Sheets-Sheet 2

INVENTOR.
Elmer J. Wade
BY
Roland A. Anderson
ATTORNEY

United States Patent Office 2,845,530
Patented July 29, 1958

2,845,530

PULSE SORTER

Elmer J. Wade, Scotia, N. Y., assignor to the United States of America as represented by the United States Atomic Energy Commission Application September 28, 1953, Serial No. 382,879

6 Claims. (Cl. 250—27)

The present invention relates to apparatus for counting the individual electrical events in a series of discrete groups of events, and more particularly to means for counting and recording the number of electrical pulses occurring in each of a timed sequence of groups of pulses. According to the invention, means are provided for periodically opening a series of pulse counting channels in order, one at a time, and for a predetermined open time interval, so that only one channel will be open at the time of occurrence of any of the electrical pulses to be sorted.

One application of the invention has been in connection with neutron energy determinations. The time-of-flight spectrometer has been utilized to obtain data on the total cross-section of materials bombarded with neutrons. In that instrument, a neutron burst of short duration may be obtained from a continuous neutron source, such as a chain reacting pile, by periodically passing a shutter through a neutron beam emerging from the pile. The neutrons are detected after having traveled a relatively long distance. Since the neutrons in the beam have different velocities, they will have different transit times between pile and detector. For energy determinations, the number of neutrons having transit times within selected limits must be totaled by a counting system. Furthermore, within those limits, the transit times may be divided into a plurality of smaller time intervals, each of which will correspond to a different neutron energy. Then if suitable separate counting channels are opened one at a time during the aforesaid small time intervals, the number of neutrons of a selected energy in each beam burst will be represented by the count of the corresponding channel.

Accordingly, it is a primary object of my invention to provide means for sorting a neutron beam according to energy wherein electrical pulses corresponding to said neutrons are sorted according to time of receipt into a plurality of counting channels, the responsive time of said channels being variable in duration.

A further object of my invention is to provide a plurality of counting channels together with means for opening the respective channels in succession for predetermined, accurately-controlled time intervals.

Another object of my invention is to provide novel timing circuits for opening and closing a plurality of counting channels.

Yet another object of the invention is to provide novel timing circuits for producing an electrical impulse of variable time duration, which duration is controlled with great accuracy.

Figure 2:
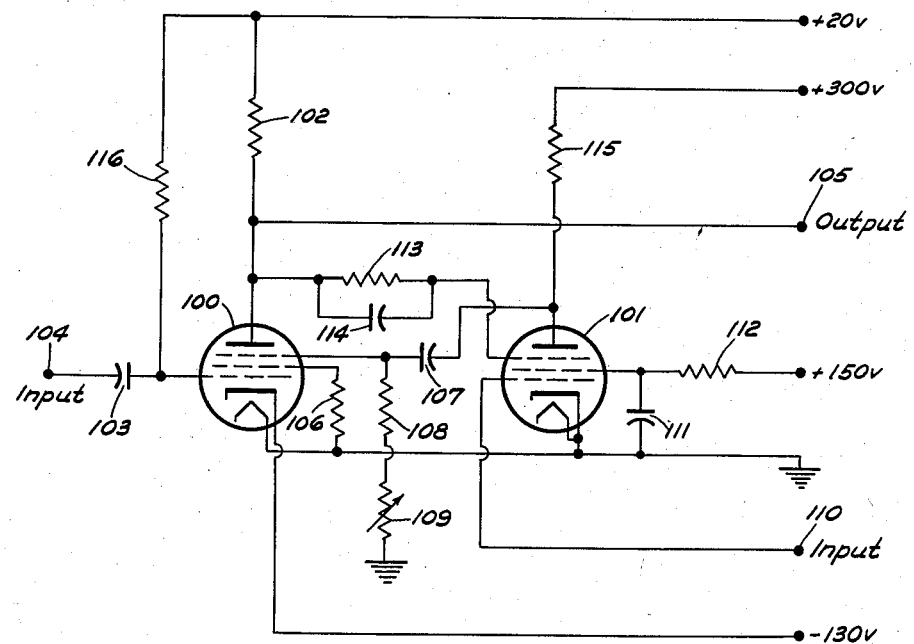

Other objects and advantages of my invention will become apparent from the following detailed description of a preferred embodiment thereof, when read in connection with the appended drawings, in which:

Figure 1 illustrates in block form an embodiment of my invention utilized in connection with a neutron velocity spectrometer, and Figure 2 illustrates in detail the circuit diagram of a timing circuit forming an integral portion of the invention shown in Figure 1.

Referring now to Figure 1, a source of a collimated beam of neutrons, which may be, for example, a chain reacting pile provided with an exit aperture for a neutron beam, or a Polonium-beryllium neutron source, is provided with a shutter 1 of a neutron absorber which may be periodically rotated back and forth across the exit aperture 2 to divide the neutron beam 3 into short bursts. The neutron beam falls upon counter 4, which may be an ionization chamber of conventional design, and to which is coupled amplifier 5. Suitably mounted near the neutron source is a source of light 9, so positioned that when the opening passes in front of the beam it will uncover the source of light, thus actuating photomultiplier tube 6. A pulse from the photomultiplier is amplified in a conventional pulse amplifier stage 7 and utilized to operate trigger circuit 8, which may be a Schmitt trigger circuit of conventional design. The output of the trigger circuit actuates a conventional scale-of-two gate generator stage 10, which in turn actuates pulse source or oscillator 11 and also enables one input of coincidence circuit C-XI. The output from the oscillator is a series of negative pulses occurring at a frequency of 40 kilocycles, for example, and which may be sharpened in pulse shaping network 13, strengthened in driver 14, and fed in parallel to each of a plurality of univibrator circuits denoted U–I to U–X. The output of generator 10 is also delivered to univibrator U–I where it triggers that circuit, causing an enabling pulse on lead 16 to coincidence circuit C–I. Pulses occurring in the ion chamber 4 at this time will be amplified and delivered through coincidence circuit C–XI to a scaler circuit S–XI. After a selected time interval, univibrator U–I will return to its original state, and trigger univibrator U–II to its unstable state. This action disables coincidence circuit C–I and enables coincidence circuit C–II, so that the next group of pulses from the ion chamber amplifier 5 will pass through coincidence circuit C–II to scaler S–II and be indicated on register R–II. After a predetermined time, univibrator U–II will return to its stable state, triggering univibrator U–III. Thus, each univibrator circuit is triggered in sequence and remains in its unstable state for a predetermined period of time, during which the corresponding coincidence circuit is enabled, so that pulses from the counter are sorted according to time into one of the ten counting channels provided. In addition, each pulse from amplifier 5 will pass through coincidence circuit C–XI into scaler S–XI and be indicated on register R–XI. This last mentioned channel sums the total counts over the entire period of operation.

When univibrator U–X returns to its stable state, it delivers a reset pulse back to the scale-of-two generator 10, flipping that circuit back to its original state, thus deenergizing oscillator 11 and bringing univibrator U–I back to its original state.

Referring now to Figure 2, the univibrator circuits shown in detail form the means for opening each of the coincidence channels in sequence. Because very accurate timing must obtain to attain satisfactory neutron energy measurements, the ordinary univibrator circuit is not suitable for opening and closing the coincidence channels. The more accurate univibrator shown in Figure 2 comprises first and second pentodes 100, 101, which may preferably be of the type 6AS6. Tube 100 is supplied with anode voltage from a source of +20 volts through resistor 102, while its cathode is returned to a source of −130 volts. The control grid is coupled through condenser 103 to the input terminal 104 where it is adapted to receive a negative pulse. The output of the stage is taken at terminal 105 which is coupled directly to the anode of tube 100. The screen grid of the tube is grounded through resistor 106, while the suppressor grid is coupled through a condenser 107 directly to the anode of tube 101, and through resistor 108 and variable resistor 109 to ground. The resistor 109 serves as a timing resistor, and may be adjusted to vary the duration of the output pulse as desired. The control grid of tube 101 is connected to input terminal 110 upon which the oscillator trigger pulses are impressed. These are preferably a series of sharp, regularly spaced, negative-going pulses. The cathode of the tube 101 is grounded, the screen grid is grounded through condenser 111 and also coupled through resistor 112 to a source of +150 volts, while the suppressor grid is coupled through a parallel resistor 113 and condenser 114 to the anode of tube 100. Plate current is supplied from a source of +300 volts through anode resistor 115.

In operation, tube 100 is normally conducting because of the coupling resistor 116, which is coupled to a source of +20 volts. Therefore the suppressor grid of tube 101 is maintained below cut off, so that tube 101 is not conducting. The oscillator trigger pulses impressed every 25 microseconds on the control grid of tube 101 have no effect on operation of that tube. When a negative pulse arrives at input 104, the control grid of tube 100 is driven toward cut-off, thereby raising the anode voltage toward +20 volts, and correspondingly raising the potential at output 105 toward +20 volts. The positive going potential at the anode is coupled through resistor 113 and condenser 114 to the suppressor grid of tube 101, allowing that tube to begin to conduct. The anode potential of tube 101 falls, and a negative pulse is coupled through condenser 107 to regeneratively cut off tube 100 by lowering the potential of its suppressor grid. The exact time required to discharge the condenser sufficiently to allow the suppressor grid voltage of tube 100 to rise above cut off is determined by the setting of resistor 109. When that cut off point is reached, tube 100 will begin to conduct again, its anode potential will fall, and tube 101 suppressor grid will fall correspondingly, allowing tube 101 to be cut off as described hereinafter.

It will be apparent that the extinguishment of tube 101 depends both on the voltage impressed on the suppressor and that received on the control grid from the oscillator. The voltage on the suppressor is not sufficient to cut off the tube by itself, so that tube 101 is actually cut off by one of the oscillator pulses on the control grid after the suppressor voltage has been lowered sufficiently to allow the control grid to take charge.

Since tube 100 will remain cut off until its suppressor grid voltage rises to the point of cut off by discharge of condenser 107 through resistors 108, 109, at which time the circuit will regenerately reset itself to the initial state, it is apparent that the setting on resistor 109 will determine the duration of the output signals, which in turn may be used to determine the respective times the coincidence channels open, in increments of 25 microseconds. It will be apparent to those skilled in the art that by using separate grids of the univibrator tubes for the triggering and synchronizing pulses, there is no tendency for the triggering pulses to trip the circuit before the gating pulses are applied to the input terminals 104. It will be noted also that the output pulse at terminal 105, which rises from −20 to +20 volts, is at the correct potential to drive the suppressor grid of a following coincidence stage. The coincidence stages may be simply 6AS6 type pentodes having their control grids coupled to the counter amplifier 5 in parallel, and their suppressor grids connected to their respective univibrator output channels.

In a preferred embodiment of the invention, component values may be selected as follows: resistor 102—5,000 ohms; condenser 103—1.5 microfarads; resistor 106—6,800 ohms; condenser 107—220 micro-microfarads; resistor 108—100,000 ohms; resistor 109 is a variable resistor; condenser 111—.1 microfarad; resistor 112—6,800 ohms; resistor 113—1 megohm; condenser 114—100 micro-microfarads; resistor 115—20,000 ohms; resistor 116—1.3 megohms.

Having described my invention what is claimed as novel is:

1. A timing circuit comprising first and second electron discharge tubes each provided with an anode, cathode, control grid, screen grid, and suppressor grid; the suppressor grid of said second tube being coupled to the anode of said first tube; a timing capacitor coupled between the suppressor grid of said first tube and the anode of said second tube; a point of reference potential, a variable timing resistance coupled between said timing capacitance and said point of reference potential; first and second sources of operating potential; first and second load impedances coupled between respective potential sources and respective anodes of said tube; a third source of operating potential coupled to the cathode of said first tube, the cathode of said second tube being coupled to said point of reference potential; a bias resistor coupling said first source of potential to the control grid of said first tube so that said tube normally conducts and said second tube is normally non-conducting; means for periodically applying a negative pulse to the control grid of said first tube to temporarily cut off said first tube and allow said second tube to conduct; a pulse source for producing a series of negative synchronizing pulses; and means coupling said synchronizing pulses to the control grid of said second tube, said pulses being of insufficient magnitude to cut off said second tube until said timing capacitor is substantially discharged; and means for deriving an output pulse from the anode of said first tube.

2. A timing circuit comprising first and second pentode tubes; means for deriving an output pulse at the anode of said first tube; a source of gating pulses coupled to the control grid of said first tube; a source of synchronizing negative pulses coupled to the control grid of said second tube; a parallel resistor and capacitor coupling the anode of said first tube with the suppressor grid of said second tube for allowing said second tube to conduct only when said first tube is not conducting; a point of reference potential; a timing network comprising a capacitor coupled between the suppressor grid of said first tube and the anode of said second tube and a variable resistance coupled between said suppressor grid of said first tube and said point of reference potential; and means for biasing the control grid of said first tube such that it will conduct only in the absence of a gating pulse thereon and when said capacitor is substantially discharged.

3. In a timing circuit of the univibrator type and comprising two interconnected pentode tubes, means for controlling the duration of the output pulse derived from the anode of one tube comprising a source of gating pulses coupled to the control grid of said one tube, means for coupling the rise and fall anode potential of said one tube to the suppressor grid of the other tube to render it conductive only while said one tube is not conducting, a resistor-condenser timing network connecting the anode of the other tube with the suppressor grid of said one tube, and a source of negative synchronizing pulses coupled to the control grid of said other tube, one of said synchronizing pulses together with said fall of potential being sufficient to cut off said other tube after a time determined by the electrical characteristics of said network.

4. Means for producing an electrical impulse of selectable duration comprising first and second pentode tubes, provided with respective load impedances and sources of energizing potential coupled therethrough in circuit with respective tube anode-cathode paths; means including one of said sources and a bias resistor connected to the control grid for maintaining said first tube normally conductive; means including a resistor and shunting capacitor coupled between the anode of said first tube and suppressor grid of said second tube for maintaining said second tube normally non-conducting; a point of reference potential; a timing network coupled to the suppressor grid of said first tube comprising a capacitor coupled to the anode of the second tube and a variable resistance coupled to said point of reference potential and said suppressor grid; an output circuit coupled to the anode of said first tube; and first and second input circuits coupled to the control grids of the respective tubes for receiving external signals.

5. In means for sorting a series of electrical information signals into groups according to time of occurrence, a plurality of parallel accumulators; means for producing first and second control signals denoting the beginning and ending of said time; a plurality of coincidence circuits having two inputs and one output, said output being connected to energize respective accumulators; circuit means coupling said information signals in parallel to one input of each coincidence circuit; first means responsive to said first control signal for generating a train of synchronizing signals of selected amplitude; a plurality of interconnected pentode univibrator circuit means for producing an electrical signal of selected duration coupled to said second coincidence circuit inputs, said univibrator circuit means being arranged in a chain with an input coupled to the output of the next preceding circuit and a second input coupled to said synchronizing signal generating means; and means responsive to said first control signal for actuating the first of said univibrator circuit means; each of said interconnected pentode univibrator circuit means comprising two pentode tubes, the said input to said univibrator circuit means coupled to the control grid of one tube; means for coupling the rise and fall anode potential of said one tube to the suppressor grid of the other tube to render it conductive only while said one tube is not conducting; a resistor-condenser timing network connecting the anode of the other tube with the suppressor grid of said one tube, said second input coupled to the control grid of said other tube, one of said synchronizing signals together with said fall of potential being sufficient to cut off said other tube after a time determined by the electrical characteristics of said timing network.

6. Means for sequentially energizing a plurality of devices for preselected time intervals comprising: a source of synchronizing pulses; a plurality of concatenated timing circuits corresponding to said devices; means for actuating both a first of said circuits and said source responsive to a control signal; each timing circuit comprising a pair of pentode tubes inter-connected to form a univibrator trigger circuit having two inputs and an output; means coupling respective first inputs to the output of the next preceding circuit to receive a triggering pulse therefrom; means coupling respective second inputs to said source to receive synchronizing pulses therefrom to control the exact reset time of said circuit; and means coupling the output from each circuit to energize its corresponding device; one of said pair of tubes of each timing circuit having a control grid connected to said first input; means for coupling the rise and fall anode potential of said one tube to the suppressor grid of the other of said pair of tubes to render said other tube conductive only while said one tube is not conducting; a resistor-condenser timing network connecting the anode of said other tube with the suppressor grid of said one tube, said second input coupled to the control grid of said other tube, one of said synchronizing pulses together with said fall of potential being sufficient to cut off said other tube after a time determined by the electrical characteristics of said timing network.

References Cited in the file of this patent

UNITED STATES PATENTS

| | | |
|---|---|---|
| 2,445,448 | Miller | July 20, 1948 |
| 2,484,081 | Dickinson | Oct. 11, 1949 |
| 2,517,986 | Dickinson | Aug. 8, 1950 |
| 2,568,750 | Krause | Sept. 25, 1951 |
| 2,591,677 | Cleeton | Apr. 8, 1952 |
| 2,605,402 | Coleman | July 29, 1952 |
| 2,640,103 | Clements | May 26, 1953 |
| 2,645,713 | Pritchard | July 14, 1953 |
| 2,724,533 | Faulkner | Nov. 22, 1955 |
| 2,734,684 | Ross et al. | Feb. 14, 1956 |